US011276032B2

(12) United States Patent
Mukherjee et al.

(10) Patent No.: US 11,276,032 B2
(45) Date of Patent: Mar. 15, 2022

(54) INTELLIGENT CLASSIFICATION FOR PRODUCT PEDIGREE IDENTIFICATION

(71) Applicant: INTERNATIONAL BUSINESS MACHINES CORPORATION, Armonk, NY (US)

(72) Inventors: Maharaj Mukherjee, Poughkeepsie, NY (US); Faried Abrahams, Laytonsville, MD (US); Gandhi Sivakumar, Bentleigh (AU); Amol Dhondse, Kothrud (IN); Anand Pikle, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 79 days.

(21) Appl. No.: 16/158,685

(22) Filed: Oct. 12, 2018

(65) Prior Publication Data
US 2020/0118060 A1    Apr. 16, 2020

(51) Int. Cl.
*G06Q 10/08* (2012.01)
(52) U.S. Cl.
CPC .................... *G06Q 10/087* (2013.01)
(58) Field of Classification Search
CPC .. G06Q 10/087; G06Q 10/06; G06Q 10/0637; G06Q 20/405; G06Q 10/067
See application file for complete search history.

(56) References Cited

U.S. PATENT DOCUMENTS

| | | |
|---|---|---|
| 7,440,901 B1 | 10/2008 | Dlott et al. |
| 2003/0182260 A1 | 9/2003 | Pickett et al. |
| 2003/0236768 A1 | 12/2003 | Sribhibadh et al. |
| 2015/0106281 A1* | 4/2015 | Klavins ............... G06Q 10/063 705/317 |
| 2015/0379510 A1* | 12/2015 | Smith ............... G06Q 20/3829 705/71 |
| 2016/0098730 A1* | 4/2016 | Feeney ............. G06Q 30/0185 705/71 |
| 2016/0217436 A1* | 7/2016 | Brama .................. G06Q 20/06 |
| 2016/0283920 A1* | 9/2016 | Fisher .................... G06Q 20/02 |
| 2017/0262862 A1* | 9/2017 | Aljawhari ............ G06F 16/242 |
| 2018/0096175 A1* | 4/2018 | Schmeling ............ G06F 1/3287 |
| 2018/0285810 A1* | 10/2018 | Ramachandran .... G06Q 10/087 |
| 2019/0147397 A1* | 5/2019 | Hodges ................... G06F 16/27 |
| 2019/0206565 A1* | 7/2019 | Shelton, IV ........... G16H 40/63 |
| 2019/0228461 A1* | 7/2019 | Domokos .......... G06Q 30/0641 |

(Continued)

OTHER PUBLICATIONS

Kumar et al. (1995). An empirical comparison of neural network and logistic regression models. Marketing Letters 6:4 (hereinafter "Kumar").*

(Continued)

*Primary Examiner* — Peter Ludwig
(74) *Attorney, Agent, or Firm* — Griffiths & Seaton PLLC

(57) ABSTRACT

A system and method for intelligent classification for product pedigree identification are presented. A transactional block may be dynamically created for recording both pedigree information for one or more supply ingredients at a time of origin and one or more parameters relating to the one or more supply ingredients at each temporal event. One or more transactional blocks may be linked via a shared ledger according to the one or more supply ingredients and the one or more parameters.

17 Claims, 8 Drawing Sheets

(56) References Cited

U.S. PATENT DOCUMENTS

2019/0259108 A1* 8/2019 Bongartz .............. A01B 79/005
2019/0340136 A1* 11/2019 Irwin .................... G06F 3/0683
2019/0340269 A1* 11/2019 Biernat .............. G05B 19/4093

OTHER PUBLICATIONS

Kairos Future, "Blockchain use cases for food traceability and control," https://www.sklkommentus.se/globalassets/kommentus/bilder/publication-eng-blockchain-for-food-traceability-and-control-2017.pdf, 2017 (68 pages).
Pavocoin, Ag, "IoT Blockchain for the AgTech Ecosystem," White Paper, Version 1.0,http://www.pavocoin.com/doc/IoT%20Blockchain%20for%20the%20AgTech%20Ecosystem.pdf, Feb. 2018 (78 pages).
Ramachandran, "The Blockchain of Food," https://www.forbes.com/sites/themixingbowl/2017/10/23/the-blockchain-of-food/#c7192c2775fd, Oct. 23, 2017 (8 pages).

* cited by examiner

INTELLIGENT CLASSIFICATION FOR PRODUCT PEDIGREE IDENTIFICATION

BACKGROUND OF THE INVENTION

Field of the Invention

The present invention relates in general to computing systems, and more particularly to, various embodiments for intelligent classification for product pedigree identification using blockchain by a processor.

Description of the Related Art

In today's society, consumers, business persons, educators, and others use various computing network systems with increasing frequency in a variety of settings. Computer systems may be found in the workplace, at home, or at school. Computer systems may include data storage systems, or disk storage systems, to process and store data. In recent years, both software and hardware technologies have experienced amazing advancement. With the new technology, more and more functions are added, and greater convenience is provided for use with these computing systems.

SUMMARY OF THE INVENTION

Various embodiments for implementing intelligent classification for product pedigree identification using one or more processors are provided. In one embodiment, by way of example only, a method for intelligent classification for product pedigree identification, again by a processor, is provided. A transactional block may be dynamically created for recording both a pedigree information for one or more supply ingredients at a time of origin and one or more parameters relating to the one or more supply ingredients at each temporal event. One or more transactional blocks may be linked via a shared ledger according to the one or more supply ingredients and the one or more parameters.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
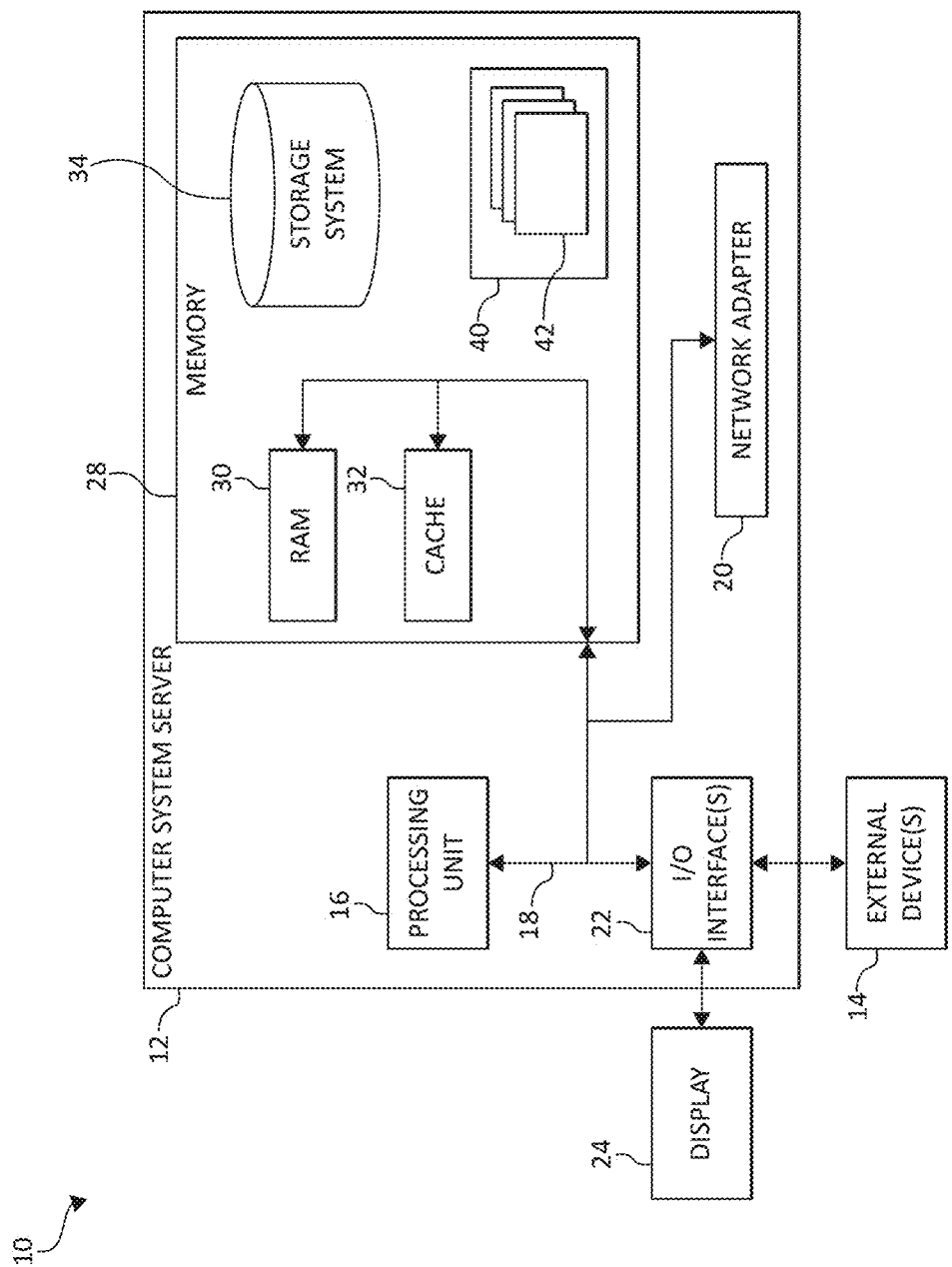
FIG. 1 is a block diagram depicting an exemplary computing node according to an embodiment of the present invention.

The quality and origin of supply ingredients (e.g., agricultural products, cleaning products, industrial products, manufacturing products, and/or other products in a supply chain) plays a vital role across many different stages of sourcing, processing and packaging, and within industries such as, for example, food processing and catering. Raw materials such as, for example, fruit, vegetables, dairy, honey, water are the basic ingredients used to create many food products. Naturally, raw material control is directly related to process control as raw ingredients are required by law, policy, or regulations to meet certain guidelines before reaching processing phases. In addition to basic laws and regulations on nutritional value of the raw ingredients, a pedigree of the ingredients such as, for example, origin, age, location, environmental factors (e.g., sun shine, soil type, method of processing etc.) plays an important role in the quality of the final product. Thus, tracking the supply chain of ingredients (e.g., agricultural products, cleaning products, industrial products, manufacturing products, and/or other products in a supply chain) from origin to final product becomes a major challenge.

For example, current supply chain tracking systems lack the ability to determine and record both environmental factors and conditioning while ensuring transparency across all producers and consumers in the supply chain. Moreover, current supply chain tracking systems also lack the ability to determine the exact pedigree of the ingredients, which determines the quality, comparison and valuation of the end-product/reliance of consumers and producers on manual recording and incomplete information about the antecedents of the ingredients.

Accordingly, various embodiments of the present invention provide a cognitive system for implementing intelligent classification for product pedigree identification so as to uniquely determine the quality of each stage of the ingredient. A transactional block may be dynamically created for recording both pedigree information for one or more supply ingredients at a time of origin and one or more parameters relating to the one or more supply ingredients at each temporal event. One or more transactional blocks may be linked via a shared ledger according to the one or more supply ingredients and the one or more parameters.

In an additional aspect, a transaction block may be dynamically created that records the pedigree of individual ingredients at the time of origin such as, for example, origin, age, location, environmental factors (e.g., sunshine, soil type, method of processing etc.). For example, the transaction block may be used for rice grown in a tropical river basin and/or in standing water, and may capture parameters such as soil type, an amount of daylight (e.g., sunshine), temperatures during harvest period, drying duration, and/or other defined parameters.

Relevant conditioning parameters may be sequentially recorded at each temporal state/transition on a shared ledger such that the transaction blocks may be sequentially linked based on product/ingredients linkages for providing visibility across producers and consumers in the supply chain.

The conditioning parameters may be extracted for association using a transaction block based on a combination of state changes (e.g., temporal events) with environmental factors in a shared cryptographic ledger using data from available sensors (e.g., temperature in greenhouse may be captured along with an acceptable temperature range). Ingredient specific variable mappers may be used for leveraging input variables (and also identifying the input variables that are to be leveraged) such as geo-spatial input, product/ingredient category and/or sub-category as atomic/child predictor variables and an aggregate/parent level predictor variables with a learning apparatus to determine temporal events/changes that are of interest and act as selected outliers (e.g., combination of unusually high temperature and humidity fluctuations during culturing may impact durability of cheese). The atomic/child predictor variables may be a next set of variables that are derived from primary category. An input mapper would be able to define and identify all input variables at parent and child level.

One or more authorized user(s) and organizations may be allowed access and retrieval of historical pedigree information and "outliers" identified by a cognitive computing system to compare and triage products based on conditioning that uniquely determines the quality at each stage of the ingredient.

Data (e.g., image, video and/or text data) may be used to identify and dynamically determine one or more temporal triggers (e.g., state changes) by using cognitive retrieval and enrichment of the metadata related to specific ingredients as part of a specific transaction block within the shared ledger (e.g., capture color of grape pulp during primary fermentation).

In one aspect, a blockchain is a distributed database that may be used to maintain a transaction ledger. A transaction ledger may denote an ordered set of transactions that have been validated or confirmed within a system up to a certain point in time. The transaction ledger may include a continuously-growing list of data records, where each data record may include data relating to one transaction. Further, encryption and other security measures may be used to secure the transaction ledger from tampering and revision. The blockchain may include a number of blocks (e.g., a transaction block), each block holding one or more individual transactions or data records. Further, each block may contain a timestamp and a link to a previous block. A blockchain network may be used and enabled users may be allowed to connect to the network, send new transactions to the blockchain, verify transactions, and create new blocks.

Accordingly, the mechanisms of the illustrated embodiments provide a blockchain for intelligent classification of product pedigree identification. One or more supply ingredients may be analyzed to extract the pedigree of the supply ingredients and inter-relationships between other supply ingredients across a supply chain using the blockchain. The present invention may use a shared ledger to securely capture temporal changes and conditioning parameters related to the origination of each of the one or more supply ingredients.

Also, as used herein, a computing system may include large scale computing called "cloud computing" in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

It should be noted that one or more computations or calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
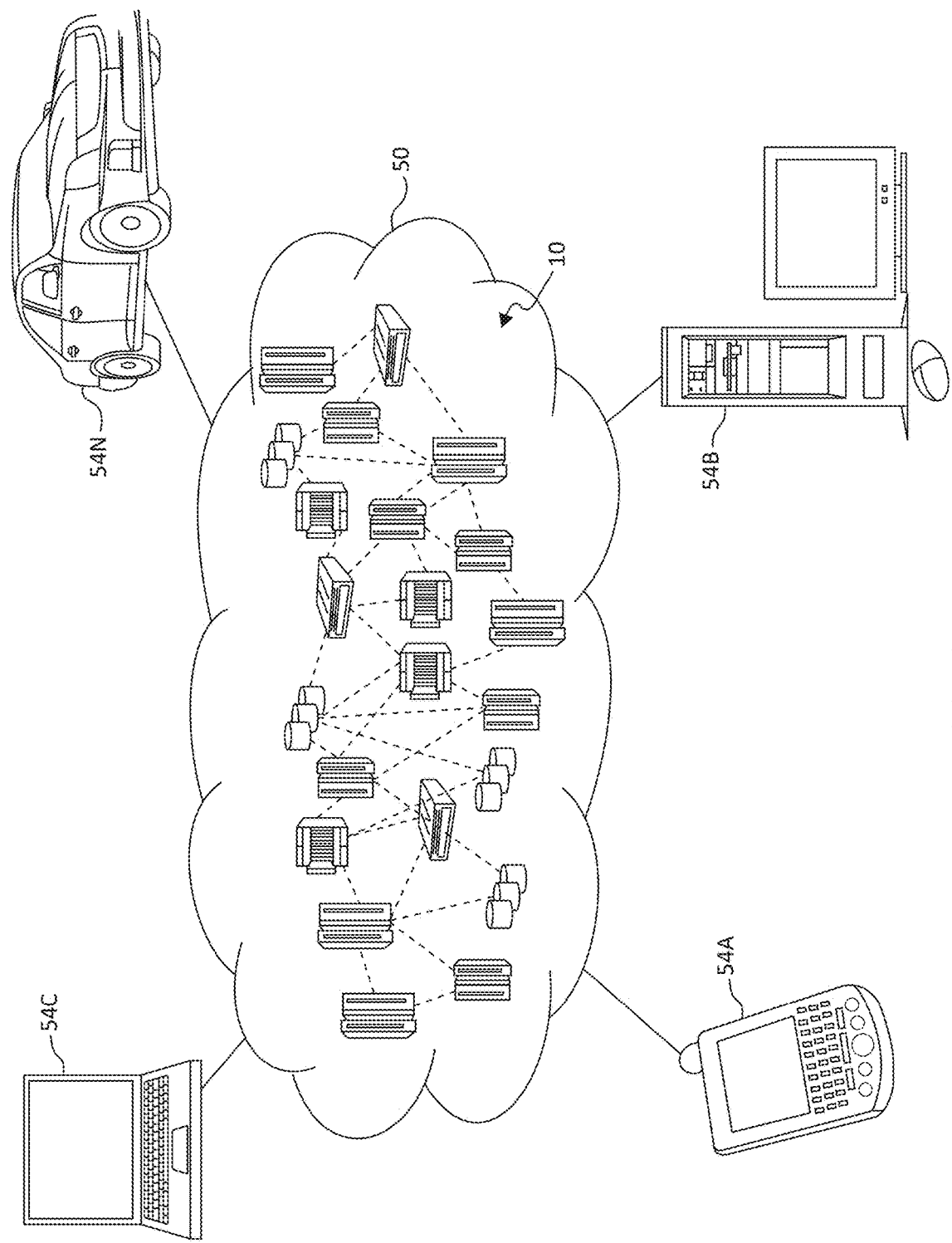
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
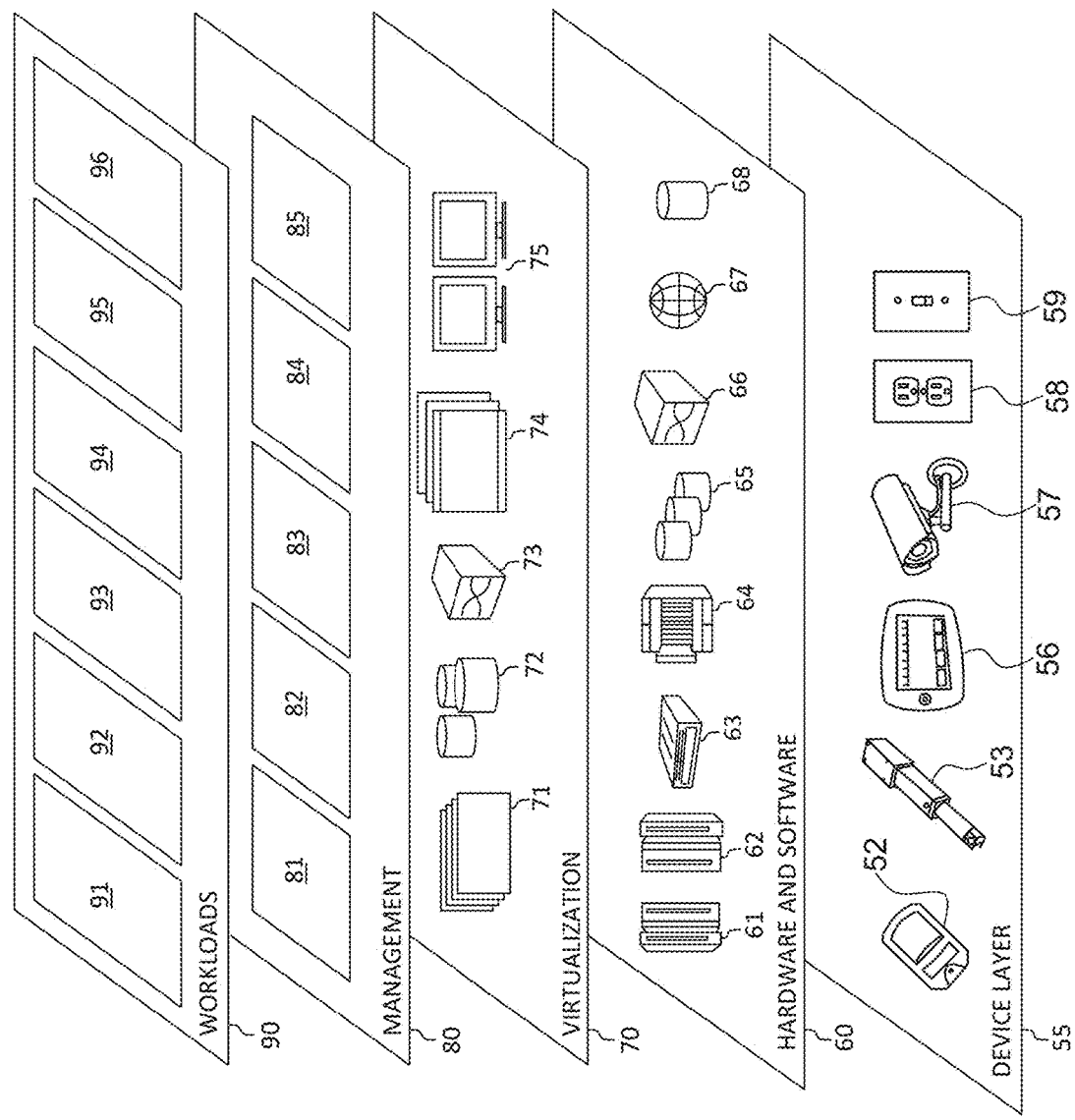
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for using blockchain for intelligent classification for product pedigree identification. In addition, workloads and functions 96 for using blockchain for intelligent classification for product pedigree identification may include such operations as data analytics, data analysis, and as will be further described, notification functionality. One of ordinary skill in the art will appreciate that the workloads and functions 96 for using blockchain for intelligent classification for product pedigree identification may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

In one aspect, the mechanisms of the illustrated embodiments provide a novel approach for implementing intelligent classification for product pedigree identification using blockchain. The blockchain may be used to provide and generate a transactional block for recording both pedigree information for one or more supply ingredients at a time of origin and one or more parameters relating to the one or more supply ingredients at each temporal event. One or more transactional blocks may be linked via a shared ledger according to the one or more supply ingredients and the one or more parameters.

Said differently, the present invention provides a framework using blockchain to classify, correlate, and dynamically build block relationships based on parameters such as, for example, time, location, and/or environmental variables. The present invention builds and leverages product relationships (with associated weight/leverage) based on a context of environmental parameters, historical data and machine learning, and/or by using associations of product/ingredients with a combination of parameters. In one aspect, the parameters may include demographics, organizational characteristics of agricultural producers and consumers, hierarchical location maps of geo-spatial map (e.g., a province is in a region that is a country, etc.), an ingredient library and classification by various ingredient types. The parameters may also include one or more dynamic parameters such as, for example, local conditions (e.g., environmental conditions associated with a local region), weather, events, time, etc. The blockchain framework builds these associations across socio-cultural demographics, time, and location via continuous learning. Each of the supply ingredient relationships may be learned, used, and leveraged via an entity relationship analysis. A cognitive agent may observe and/or learn one or more events and identifies a level of variance in terms of observed outcomes using supervised control set training and feedback from machine learning and/or professional experts on the quality of results.

Figure 4:
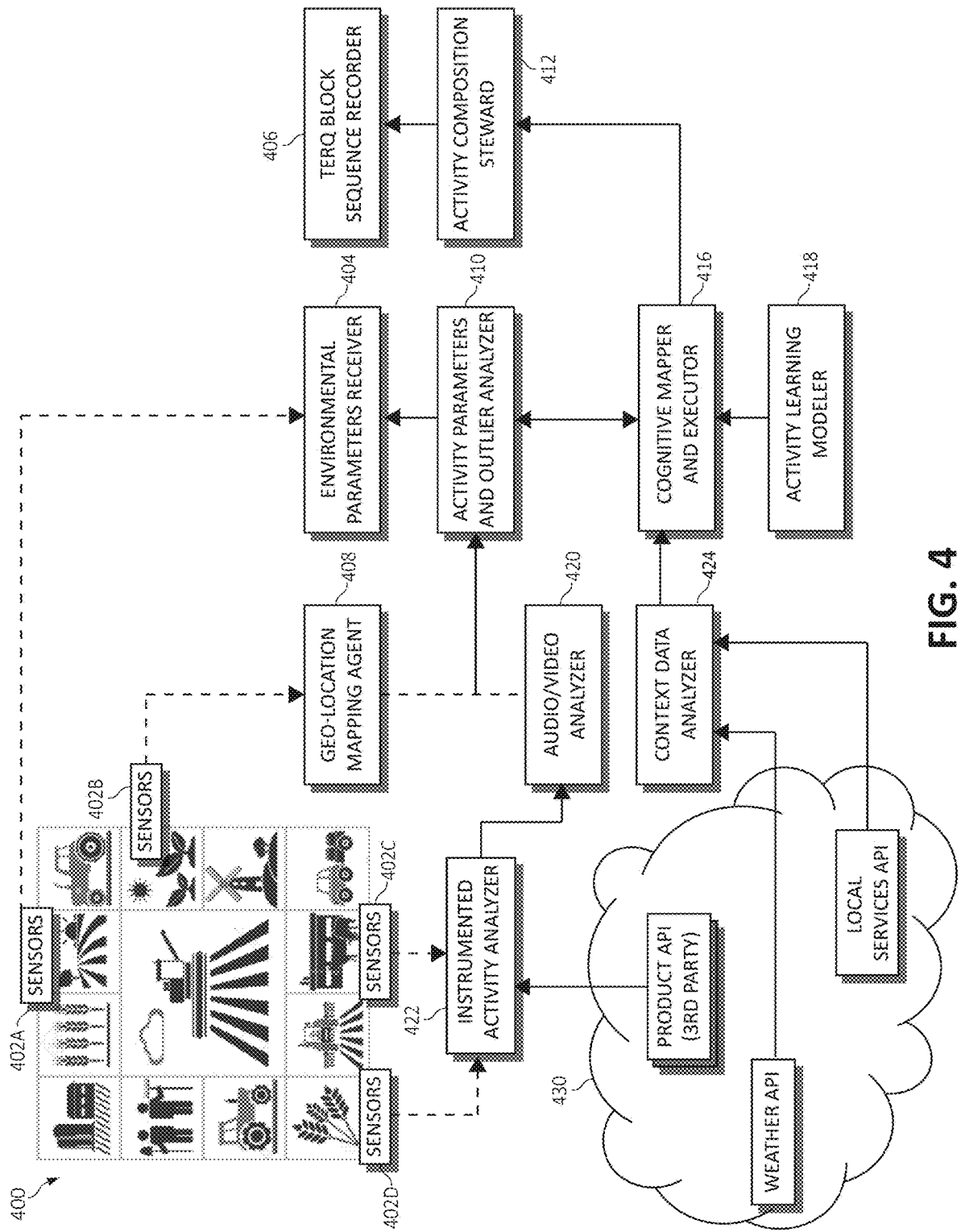
FIG. 4 is a block flow diagram depicting an exemplary system for intelligent classification for product pedigree identification by a processor, again in which aspects of the present invention may be realized.

Turning now to FIG. 4, a block diagram of exemplary functionality of a computing system 400 for intelligent classification for product pedigree identification using blockchain in a cloud storage system is depicted. In one aspect, one or more of the components, modules, services, applications, and/or functions described in FIGS. 1-3 may be used in FIG. 4. As will be seen, many of the functional blocks may also be considered "modules" of functionality, in the same descriptive sense as has been previously described in FIGS. 1-4.

As shown, the computing system 400 may be a cloud-based solution in a cloud computing system and having one or more sensors and/or actuators such as, for example, sensors 402A-D located at one or more locations associated with sources of supply ingredients (e.g., soil sensors, weather, location images/videos, etc.).

In operation, the sensors 402A-D may capture run-time and environmental parameters from available sources to identify and capture surrounding run-time parameters associated with the supply ingredients such as, for example, data captured from sensors 402A-D for soil, weather, location images/videos, etc. For example, data captured from sensor 402A may be communicated/sent to an environmental parameters receiver 404. The data captured from sensor 402B may be communicated/sent to a geo-location mapping agent 408. The data captured from sensor 402C and 402D may be communicated/sent to an instrumented activity analyzer 422. A cloud computing system 430 may also provide one or more application programming interfaces ("API") such as, for example, a weather API, a local services API, and/or third party product APIs for also sending data to the instrumented activity analyzer 422, and/or a context data analyzer 424. The instrumented activity analyzer 422 may analyze the received data and pass the analyzed data to an audio/video analyzer 420. The audio/video analyzer 420 may also receive geographical location data and geo-location mapping from the geo-location mapping agent 408

(e.g., hierarchical location map of a geo-spatial map such as, for example, country, region, province, etc.). The received data may be analyzed and passed to an activity parameters and outlier analyzer 410.

Returning to the context data analyzer 424, the context data analyzer 424 may analyze and identify the context of the received data and pass the analyzed data to a cognitive mapper and executor 416, which may also receive activity learning information from an activity learning model 418 and/or activity parameters and outlier data from the activity parameters and outlier analyzer. The cognitive mapper and executor 416 may process and cognitively analyze the received data and send to the data to the activity parameters and outlier analyzer 410 and an activity composition steward 412. A temporal event relation quotient ("TERQ") block sequence recorder 406 may receive the data from the activity composition steward 412 and record each sequence of transitions pertaining to the supply ingredients.

Thus, in a general aspect, the computing system 400 may capture surrounding run-time parameters associated with the supply ingredients. Metadata associated with the captured data and parameters may be extracted and correlated according to a cognitive analysis of temporal events/state changes such as, for example, capturing a description of a hop (color, variety, etc.) from images during dry hopping of an alcoholic beverage. The conditioning factors may be validated with external sources and qualify for association with a block in a shared cryptographic ledger using data from available sensors such as, for example, sensors 402A-D.

Figure 5:
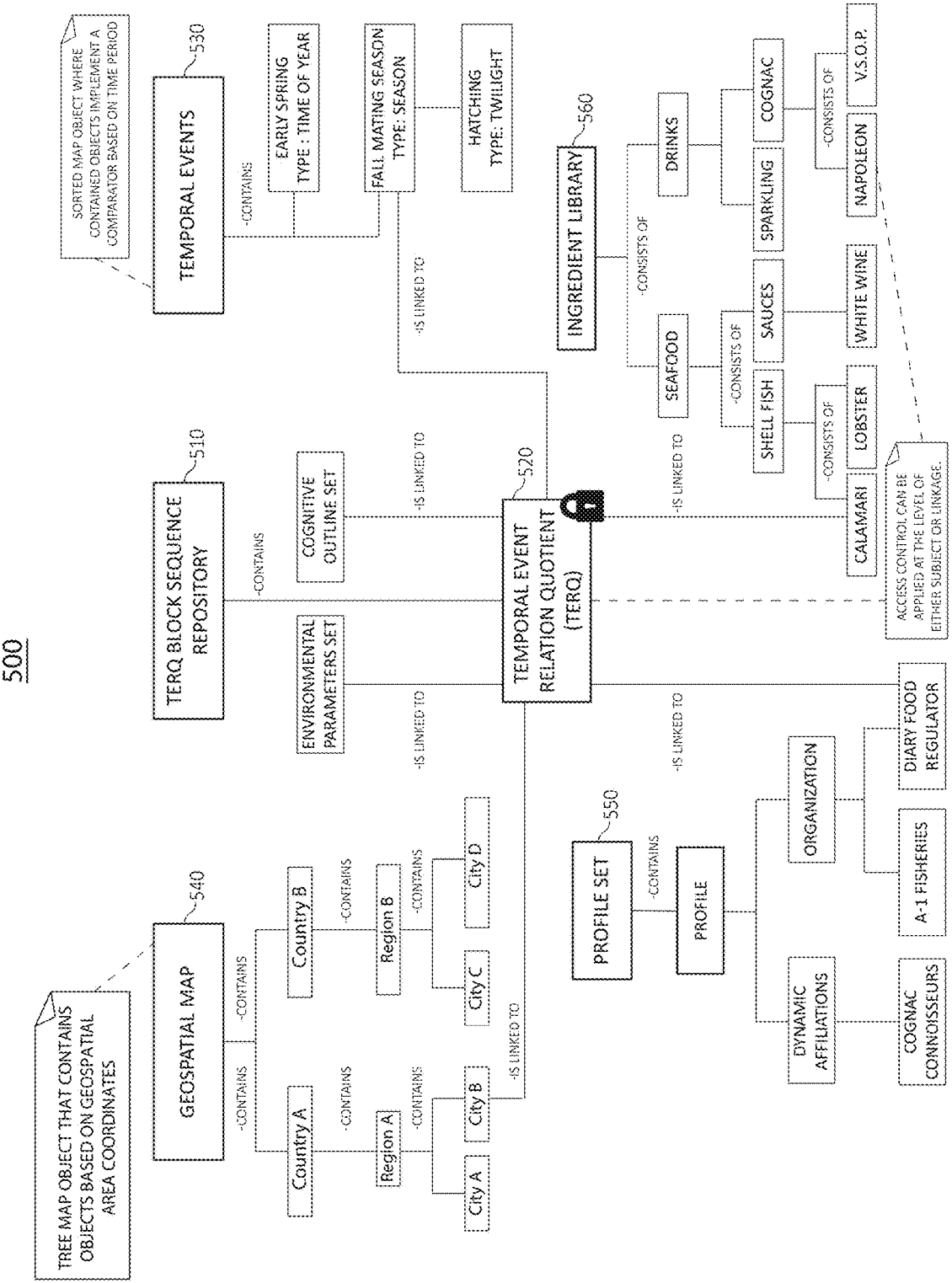
FIG. 5 is an additional block diagram depicting an exemplary data model for intelligent classification for product pedigree identification in which aspects of the present invention may be realized.

Turning now to FIG. 5, a block diagram of exemplary functionality of a computing system 500 using a data model for intelligent classification for product pedigree identification using blockchain in a cloud storage system is depicted. In one aspect, one or more of the components, modules, services, applications, and/or functions described in FIGS. 1-4 may be used in FIG. 5. As will be seen, many of the functional blocks may also be considered "modules" of functionality, in the same descriptive sense as has been previously described in FIGS. 1-4.

As shown, the computing system 500 includes a TERQ block sequence repository 510, a temporal events block 530 (e.g., a TERQ block chain or a shared ledger), a geospatial map block 540, a temporal event relation quotient block 520 (e.g., a shared ledger), a profile set block 550, and/or an ingredient library block 560. The objects of the geospatial map block 540, the temporal events block 530, the profile set block 550, and/or the ingredient library block 560 in the block chain may be a hierarchal structure and/or tree map. For example, geospatial map block 540 may be a tree map that contains one or more additional objects based on geospatial area coordinates (e.g., country A includes region A that includes city A.).

As an additional example, the temporal events block 530 may be a sorted map object where one or more contained objects may implement a comparator according to a selected time period (e.g., a temporal event may occur at a selected time of year, season, and/or time of day). The ingredient library block 560 may include, for example one or more classifications/categories for supply ingredients (e.g., agricultural products including, for example) seafood may include shell fish, sauces, and the shell fish includes calamari, and lobster and also the sauces include white wine). Also, each object in the various block chains may be associated with one or more other blocks. For example, the ingredient library block 560 for seafood may be associated with the sauce that may include a selected type of beverage (e.g., white wine). As an additional example, the profile set 550 may include a profile with one or more dynamic affiliations (e.g., a beverage connoisseurs) and/or an organization that includes fisheries and/or a dairy food regulator. In one aspect, the temporal event relation quotient 520 (e.g., the shared ledger) can apply access control at the level of either a subject and/or linkage. It should be noted that the various embodiments described herein are applied, by way of example only, to agricultural products but may also apply to other types of supply ingredients. Thus, as aforementioned, the supply ingredients may be inclusive of any number of products in a supply chain such as, for example, cleaning products, industrial products, manufacturing products, and/or other products in a supply chain.

Using the temporal event relation quotient block 520 (e.g., shared ledger), one or more predictor variables may be identified that determine one or more temporal events/state transitions. A predictor variable is a variable used in regression to predict another variable. The predictor variable may be identified and may determine is sometimes referred to as an independent variable if it is manipulated rather than just measured For example, one or more predictor variables may be identified that individually and/or in combination help identify temporal events/state changes that determine the characteristics of the final product (e.g., certain pre-processing in edible oil may make final product more stable at high temperatures, etc.). The parameters may capture values for predictor variables coalescing all relevant past values. The information about the temporal event may be enhanced each time a similar ingredient is processed by analyzing an influence across all the predictor variables.

One or more temporal events may be determined to capture on the temporal event relation quotient block 520 (e.g., the shared ledger). For example, a machine learning operation (e.g., supervised learning) may be performed to determine what combination of parameters in ingredient conditioning may be most relevant to a final product, which leverages the hierarchical nature of qualitative input parameters such as, for example, the geo-spatial input, product/ingredient category and/or sub-category as predictor variables.

By using historical data on accuracy of past outcomes, a machine learning operation may develop a data model that may iteratively estimate a probability of a certain event and/or a combination of parameters (or their parent class in the hierarchy) being of interest, by reverse fitting a probability function.

The data model may be generated that predicts whether an event and/or combination of parameters may qualify as being of interest and act as an outlier, as a dichotomous dependent variable whose value may be derived from set of independent predictor variables. An outlier may be an observation point that is distant from other observations. An outlier may be due to variability in the measurement or it may indicate experimental error; the latter are sometimes excluded from the data set. A logistic regression model may be employed, which does not assume multi-normality and provides an estimate for a probability of win (e.g., probability of more accurate results). The logistic regression model may derive one or more coefficients of independent variables (e.g., predictor variables) to predict default probability of occurrence of a dichotomous dependent variable.

In the context of win prediction, the technique weighs the predictor variable using a logic function and creates a probability that a combination of parameters is of interest in a temporal event for the given value and/or range of the predictor variable, using the function in logit analysis, called the logistic function.

One or more ingredient specific variable mappers (e.g., components that identify a variable based on context) with the machine learning operation may be used to determine outlier ingredient characteristics, and capture these as part of the pedigree details.

Figure 6A:
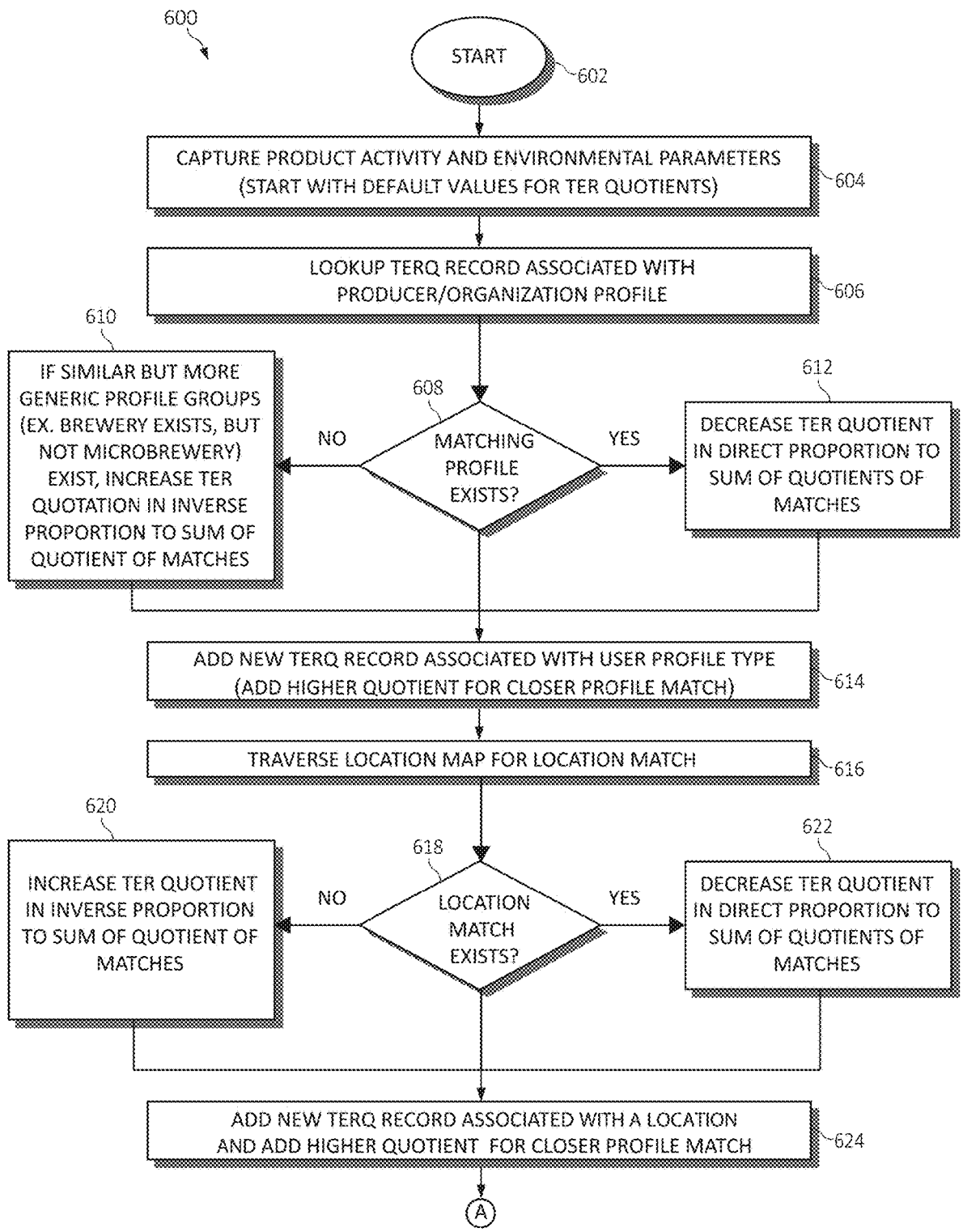
FIGS. 6A-6B is a flowchart diagram depicting an exemplary method for implementing intelligent classification for product pedigree identification by a processor, again in which aspects of the present invention may be realized.
Figure 6B:
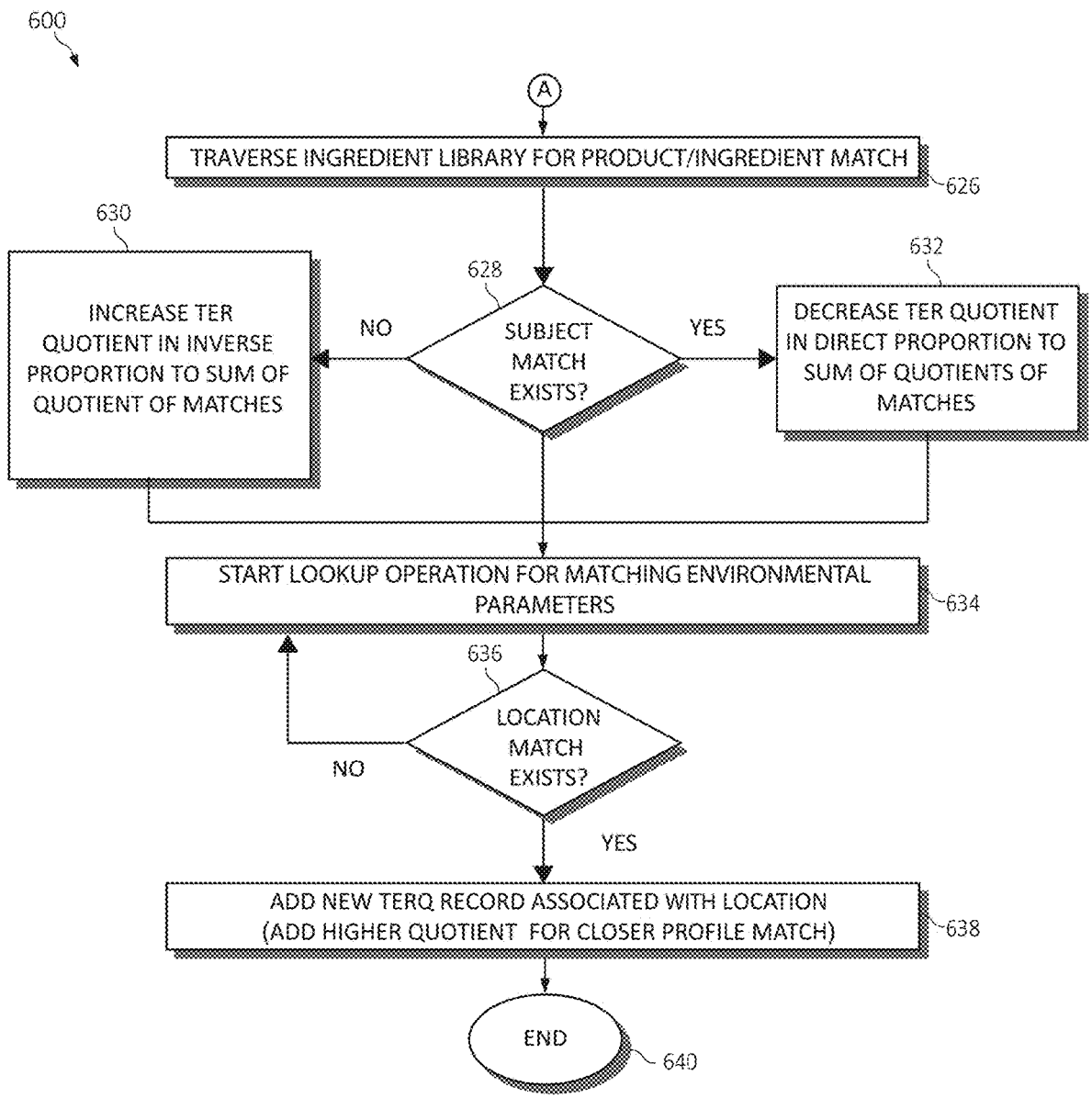

A transaction block may be dynamically created that records temporal events in the life of individual ingredient at the time of origin such as, for example, origin, age, location, environmental factors (e.g., daylight, soil type, method of processing as described in FIGS. 6A-6B.

A pedigree correlation and density (e.g., a relationship between a different set of products based on context and density and is a probability of fitment) may be retrieved from a shared ledger: A clustering operation may be used to determine a measure of correlation in terms of closest matches according to a certain product and/or ingredient. The compactness of the clusters may be measured using a similarity measure by measuring an intra-cluster homogeneity, an inter-cluster separability, and/or a combination thereof such as, for example, a scatter criteria to identify clusters having a density higher as compared to an evolving threshold and each predictor variable is within individual variable threshold limits. This provides a number of other "similar" ingredients conditioned with a similar set of conditioning parameters (or their parent classes) such as, for example, similar characteristics can be identified based on threshold limits identified and other similar ingredients and relationship mapping can be performed.

The scalar scatter criteria may be derived from scatter matrices, reflecting the within-cluster scatter, the between-cluster scatter and the summation of the within-cluster scatter, the between-cluster scatter, which may be a total scatter matrix. For a kth cluster, the scatter matrix may be calculated as:

$$S_k = \Sigma x \in C_k (x-\mu k)(x-\mu k) \quad (1),$$

where $C_k$ equals the cluster k, $S_k$ is a scatter matrix of K number of elements, and T is time. The within-cluster scatter matrix ("$S_w$") is calculated as the summation of the scatter matrix over all clusters:

$$S_w = \Sigma_{k=1}^{K} S_k \quad (2),$$

The between-cluster scatter matrix ("$S_B$") may be calculated as:

$$S_B = \Sigma_{k=1}^{K} Nk(\mu k-\mu)(\mu k-\mu)T \quad (3),$$

where $\mu$ is the total mean vector and is defined as:

$$\mu = 1/m \Sigma_{k=1}^{K} Nk\mu k \quad (4),$$

and $N_k = |Ck_i|$ is a number of instances belonging to cluster k.

Also, minimizing the trace of $S_w$ represents the within-cluster scatter (e.g., closer the match). Another criterion, which may be maximized, is the between cluster criterion.

Turning now to FIGS. 6A-6B, a method 600 for capturing pedigree details for intelligent classification for product pedigree identification by a processor is depicted. The functionality 600 may be implemented as a method executed as instructions on a machine, where the instructions are included on at least one computer readable medium or one non-transitory machine-readable storage medium. The functionality 600 may start in block 602.

Product agricultural activity and environmental parameters may be captured, as in block 604. In one aspect, default values may be used for a temporal event relation ("TER") quotients. A TERQ record associated with a producer and/or organization profiled may be located (e.g., lookup operation), as in block 606. A determination operation may performed to determine if matching profiles exists, as in block 608. If no, the TER quotient may be increased in an inverse proportion to sum of the quotient of matches (if the matches are similar but are generic profile groups), as in block 610. If yes from block 608, the TER quotient may be decreased in direct proportion to a sum of the quotient of matches, as in block 612. For both blocks 610 and 612, a new TERQ record associated with the user profile type may be added, as in block 614. A higher quotient may be added for closer matching profiles (e.g., the higher or increased quotient value is needed for matching profiles based on prediction). A location map may be traversed for a location match (e.g., identified matching locations for supply ingredients), as in block 616.

A determination operation may be performed to determine whether matching locations exist, as in block 618. If no at block 618, the TER quotient may be increased in inverse proportion to a sum of the quotient of matches, as in block 620. An operation to move up (e.g., zoom out of the map) may be performed and a seek operation may be performed for matching TERQ records. If yes from block 618, the TER quotient may be decreased in direct proportion to a sum of the quotient of matches, as in block 622. A new TERQ record associated with a location may be added, as in block 624. A higher quotient may be added for closer matching profiles. An ingredient library may be traversed for identifying agricultural product/ingredient match, as in block 626.

A determination operation may be performed to determine whether a subject match exist, as in block 628. If no at block 628, the TER quotient may be increased in inverse proportion to a sum of the quotient of matches, as in block 630. An operation to move up to broader ingredient categories may be performed and a seek operation may be performed for matching TERQ records. If yes from block 628, the TER quotient may be decreased in direct proportion to a sum of the quotient of matches, as in block 632.

From both blocks 630 and 632, a lookup operation may be started for matching environmental parameters, as in block 634. A determination operation may be performed to determine whether a parameters match exist, as in block 628. A new TERQ record associated with an ingredient may be added, as in block 638. A higher quotient may be added for closer matching profiles. The functionality 600 may end, as in block 640.

Figure 7:
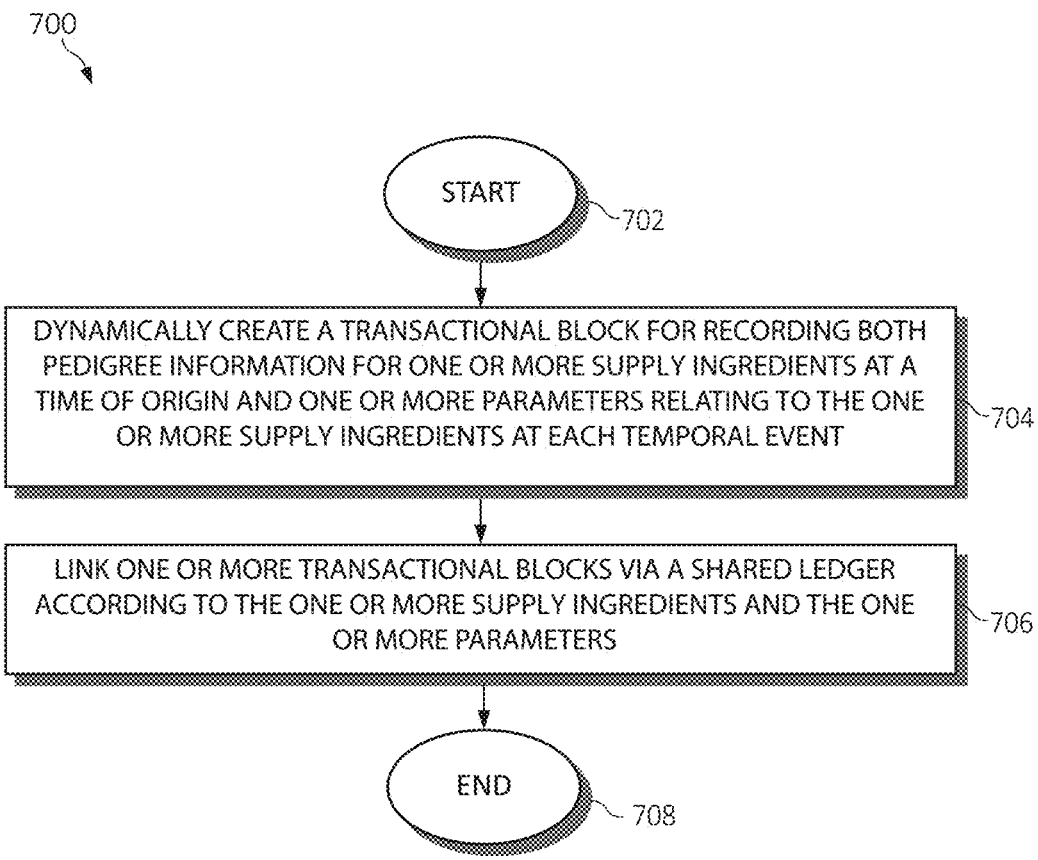
FIG. 7 is a flowchart diagram depicting an additional exemplary method for implementing intelligent classification for product pedigree identification by a processor, again in which aspects of the present invention may be realized.

Turning now to FIG. 7, a method 700 for implementing intelligent classification for product pedigree identification by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702.

A transactional block may be dynamically created for recording both pedigree information for one or more supply ingredients at a time of origin and one or more parameters relating to the one or more supply ingredients at each temporal event, as in block 704. One or more transactional blocks may be linked via a shared ledger according to the one or more supply ingredients and the one or more parameters, as in block 706. The functionality 700 may end, as in block 708.

In one aspect, in conjunction with and/or as part of at least one block of FIG. 7, the operations of method 700 may include each of the following. The operations of method 700 may use the one or more licensing tokens from the pool of licensing tokens upon initiating a login operation to the one or more applications. One or more licensing tokens may be returned to the pool of licensing tokens upon terminating use of the one or more applications, or the one or more licensing tokens may be used, returned to the pool of licensing tokens, by an alternative user for the one or more applications, an alternative application, or a combination thereof.

The operations of method 700 may extract usage data of the one or more applications and/or convert the usage data into a blockchain data structure for storing in the transactional database. The usage data of the one or more applications may be recorded in the transactional database. One or more relationships may be dynamically built between one or more supply ingredients according to the one or more parameters, a classification, a selected location, a profile of each of the one or more supply ingredients, one or more variables, or a combination thereof.

The usage data storage may be stored in the transactional database via an interactive graphical user interface (GUI) of a computing device. The operations of method 700 may determine usage of the one or more applications exceeds a total number of the pool of licensing tokens using the transactional database.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for using blockchain for intelligent classification for product pedigree identification by a processor, comprising:
dynamically creating a transactional block for recording both pedigree information for each of a plurality of supply ingredients at a time of origin and one or more parameters relating to the plurality of supply ingredients at each of a plurality of temporal events occurring during a lifecycle of the plurality of supply ingredients, wherein each of the plurality of supply ingredients are different types of tangible raw materials produced by and received from a plurality of separate physical supply chain entities;
determining each temporal event or changes to each of the temporal events according to the one or more parameters, one or more variables, and fluctuations in the one or more variables, wherein the one or more variables include one or more predictor variables each having values coalesced from relevant historical values of the one or more parameters, and wherein a machine learning operation is trained to develop a logistic regression model used to determine which combination of the one or more parameters contribute to a determined quality of a final product incorporating the plurality of supply ingredients according to the one or more predictor variables;
generating one or more ingredient-specific variable mappers in an ingredient pedigree by the machine learning operation using the logistic regression model for each of the plurality of supply ingredients comprised within the final product, wherein the pedigree information and the one or more ingredient-specific variable mappers capture antecedent and processing information of the plurality of supply ingredients with respect to the production by the plurality of separate physical supply chain entities, and wherein the one or more ingredient-specific variable mappers capture outlier ingredient characteristics to derive which of the plurality of ingredients, and the combination of the one or more parameters thereof, are those of the plurality of supply ingredients that contribute to the determined quality of the final product; and
linking one or more transactional blocks via a shared ledger according to the plurality of supply ingredients and the one or more parameters, wherein linking the one or more transactional blocks includes performing, using the one or more ingredient-specific variable mappers, a relationship analysis between contextual aspects of each of the plurality of supply ingredients and the plurality of separate physical supply chain entities contributing to the final product, and wherein the relationship analysis identifies demographics, organizational characteristics, and hierarchal locations of geo-spatial characteristics of the contextual aspects of the plurality of supply ingredients and the plurality of separate physical supply chain entities that contribute to identified associations across socio-cultural demographics, time, and locations with respect to the one or more parameters, the plurality of separate physical supply chain entities, and the plurality of supply ingredients based on the determined quality of the final product.

2. The method of claim 1, further including recording the pedigree information and the one or more parameters of each temporal event on the shared ledger.

3. The method of claim 1, further including extracting the one or more parameters and the one or more variables from one or more data sources.

4. The method of claim 1, further including associating the one or more parameters and the one or more variables with the plurality of supply ingredients.

5. The method of claim 1, further including dynamically building one or more relationships between the plurality of supply ingredients according to the one or more parameters, a classification, a selected location, a profile of each of the plurality of supply ingredients, the one or more variables, or a combination thereof.

6. The method of claim 1, further including determining a match between the plurality of supply ingredients and one or more alternative supply ingredients for linking the one or more transactional blocks via the shared ledger.

7. A system for using blockchain for intelligent classification for product pedigree identification, comprising:
one or more computers with executable instructions that when executed cause the system to:
dynamically create a transactional block for recording both pedigree information for one or more supply ingredients at a time of origin and one or more parameters relating to the one or more supply ingredients at each of a plurality of temporal events occurring during a lifecycle of the one or more ingredients, wherein each of the plurality of supply ingredients are different types of tangible raw materials produced by and received from a plurality of separate physical supply chain entities;
determine each temporal event or changes to each of the temporal events according to the one or more parameters, one or more variables, and fluctuations in the one or more variables, wherein the one or more variables include one or more predictor variables each having values coalesced from relevant historical values of the one or more parameters, and wherein a machine learning operation is trained to develop a logistic regression model used to determine which combination of the one or more parameters contribute to a determined quality of a final product incorporating the plurality of supply ingredients according to the one or more predictor variables;
generate one or more ingredient-specific variable mappers in an ingredient pedigree by the machine learning operation using the logistic regression model for each of the plurality of supply ingredients comprised within the final product, wherein the pedigree information and the one or more ingredient-specific variable mappers capture antecedent and processing information of the plurality of supply ingredients with respect to the production by the plurality of separate physical supply chain entities, and wherein the one or more ingredient-specific variable mappers capture outlier ingredient characteristics to derive which of the plurality of ingredients, and the combination of the one or more parameters thereof, are those of the plurality of supply ingredients that contribute to the determined quality of the final product; and link one or more transactional blocks via a shared ledger according to the plurality of supply ingredients and the one or more parameters, wherein linking the one or more transactional blocks includes performing, using the one or more ingredient-specific variable mappers, a relationship analysis between contextual aspects of each of the plurality of supply ingredients and the plurality of separate physical supply chain entities contributing to the final product, and wherein the relationship analysis identifies demographics, organizational characteristics, and hierarchal locations of geo-spatial characteristics of the contextual aspects of the plurality of supply ingredients and the plurality of separate physical supply chain entities that contribute to identified associations across socio-cultural demographics, time, and locations with respect to the one or more parameters, the plurality of separate physical supply chain entities, and the plurality of supply ingredients based on the determined quality of the final product.

8. The system of claim 7, wherein the executable instructions further record the pedigree information and the one or more parameters of each temporal event on the shared ledger.

9. The system of claim 7, wherein the executable instructions further extract the one or more parameters and the one or more variables from one or more data sources.

10. The system of claim 7, wherein the executable instructions further associate the one or more parameters and the one or more variables with the plurality of supply ingredients.

11. The system of claim 7, wherein the executable instructions further dynamically build one or more relationships between the plurality of supply ingredients according to the one or more parameters, a classification, a selected location, a profile of each of the plurality of supply ingredients, the one or more variables, or a combination thereof.

12. The system of claim 7, wherein the executable instructions further determine a match between the plurality of supply ingredients and one or more alternative supply ingredients for linking the one or more transactional blocks via the shared ledger.

13. A computer program product for using blockchain for intelligent classification for product pedigree identification, the computer program product comprising a non-transitory computer-readable storage medium having computer-readable program code portions stored therein, the computer-readable program code portions comprising:

an executable portion that dynamically creates a transactional block for recording both pedigree information for one or more supply ingredients at a time of origin and one or more parameters relating to the one or more supply ingredients at each of a plurality of temporal events occurring during a lifecycle of the one or more ingredients, wherein each of the plurality of supply ingredients are different types of tangible raw materials produced by and received from a plurality of separate physical supply chain entities;

an executable portion that determines each temporal event or changes to each of the temporal events according to the one or more parameters, one or more variables, and fluctuations in the one or more variables, wherein the one or more variables include one or more predictor variables each having values coalesced from relevant historical values of the one or more parameters, and wherein a machine learning operation is trained to develop a logistic regression model used to determine which combination of the one or more parameters contribute to a determined quality of a final product incorporating the plurality of supply ingredients according to the one or more predictor variables;

an executable portion that generates one or more ingredient-specific variable mappers in an ingredient pedigree by the machine learning operation using the logistic regression model for each of the plurality of supply ingredients comprised within the final product, wherein the pedigree information and the one or more ingredient-specific variable mappers capture antecedent and processing information of the plurality of supply ingredients with respect to the production by the plurality of separate physical supply chain entities, and wherein the one or more ingredient-specific variable mappers capture outlier ingredient characteristics to derive which of the plurality of ingredients, and the combination of the one or more parameters thereof, are those of the plurality of supply ingredients that contribute to the determined quality of the final product; and an executable portion that links one or more transactional blocks via a shared ledger according to the plurality of supply ingredients and the one or more parameters, wherein linking the one or more transactional blocks includes performing, using the one or more ingredient-specific variable mappers, a relationship analysis between contextual aspects of each of the plurality of supply ingredients and the plurality of separate physical supply chain entities contributing to the final product, and wherein the relationship analysis identifies demographics, organizational characteristics, and hierarchal locations of geo-spatial characteristics of the contextual aspects of the plurality of supply ingredients and the plurality of separate physical supply chain entities that contribute to identified associations across socio-cultural demographics, time, and locations with respect to the one or more parameters, the plurality of separate physical supply chain entities, and the plurality of supply ingredients based on the determined quality of the final product.

14. The computer program product of claim 13, further including an executable portion that records the pedigree information and the one or more parameters of each temporal event on the shared ledger.

15. The computer program product of claim 13, further including an executable portion that:

extracts the one or more parameters and the one or more variables from one or more data sources; and associates the one or more parameters and the one or more variables with the plurality of supply ingredients.

16. The computer program product of claim 13, further including an executable portion that dynamically builds one or more relationships between the plurality of supply ingredients according to the one or more parameters, a classification, a selected location, a profile of each of the plurality of supply ingredients, the one or more variables, or a combination thereof.

17. The computer program product of claim 13, further including an executable portion that determines a match between the plurality of supply ingredients and one or more alternative supply ingredients for linking the one or more transactional blocks via the shared ledger.

\* \* \* \* \*